United States Patent
Aono et al.

(10) Patent No.: US 12,111,425 B2
(45) Date of Patent: Oct. 8, 2024

(54) SIMULATOR DEVICE

(71) Applicant: HONDA MOTOR CO., LTD., Tokyo (JP)

(72) Inventors: Kento Aono, Tochigi-ken (JP); Shoji Matsuda, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 871 days.

(21) Appl. No.: 17/277,322

(22) PCT Filed: Sep. 10, 2019

(86) PCT No.: PCT/JP2019/035440
§ 371 (c)(1),
(2) Date: Mar. 18, 2021

(87) PCT Pub. No.: WO2020/059568
PCT Pub. Date: Mar. 26, 2020

(65) Prior Publication Data
US 2022/0026546 A1    Jan. 27, 2022

(30) Foreign Application Priority Data
Sep. 21, 2018 (JP) ................. 2018-177986

(51) Int. Cl.
*G01S 7/497* (2006.01)
*G02B 19/00* (2006.01)

(52) U.S. Cl.
CPC .......... *G01S 7/497* (2013.01); *G02B 19/0009* (2013.01); *G02B 19/0047* (2013.01)

(58) Field of Classification Search
None
See application file for complete search history.

(56) References Cited

U.S. PATENT DOCUMENTS

| 4,611,911 A | 9/1986 | Kadomatsu |
| 5,264,905 A | 11/1993 | Cavanagh et al. |
| (Continued) | | |

FOREIGN PATENT DOCUMENTS

| CN | 1743867 | 3/2006 |
| DE | 3325380 | 1/1985 |
| (Continued) | | |

OTHER PUBLICATIONS

International Search Report and Written Opinion for International Application No. PCT/JP2019/035440 mailed on Dec. 3, 2019, 12 pages.

(Continued)

*Primary Examiner* — Luke D Ratcliffe
(74) *Attorney, Agent, or Firm* — Amin, Turocy & Watson, LLP

(57) ABSTRACT

Provided is a simulator device allowing simplification and cost minimization. A simulator device that generates and emits, to a LiDAR shining a laser light at a plurality of scanning locations, a false light corresponding to said laser light, and comprises: a light focusing unit that focuses the laser light shined at the plurality of scanning locations; and a simulator that, in accordance with the laser light focused by the light focusing unit, generates the false light resembling scattered light that is produced in a prescribed location, and emits the false light to the LiDAR via the light focusing unit.

3 Claims, 4 Drawing Sheets

(56) References Cited

U.S. PATENT DOCUMENTS

| | | | |
|---|---|---|---|
| 8,368,876 B1 | 2/2013 | Johnson et al. | |
| 2014/0192340 A1 | 7/2014 | Nishikata et al. | |
| 2015/0234039 A1* | 8/2015 | Bates | G01S 7/497 356/6 |
| 2019/0253701 A1* | 8/2019 | Himel | G01S 17/89 |

FOREIGN PATENT DOCUMENTS

| | | |
|---|---|---|
| GB | 1475374 | 6/1977 |
| JP | 47-032851 | 11/1972 |
| JP | 60-135880 | 7/1985 |
| JP | 61-079176 | 4/1986 |
| JP | 02-014082 | 1/1990 |
| JP | 2001-215275 | 8/2001 |
| JP | 2009-257828 | 11/2009 |
| JP | 2014-134405 | 7/2014 |

OTHER PUBLICATIONS

Chinese Office Action and Search Report for Chinese Patent Application No. 201980062114.X dated Jul. 27, 2023.

* cited by examiner

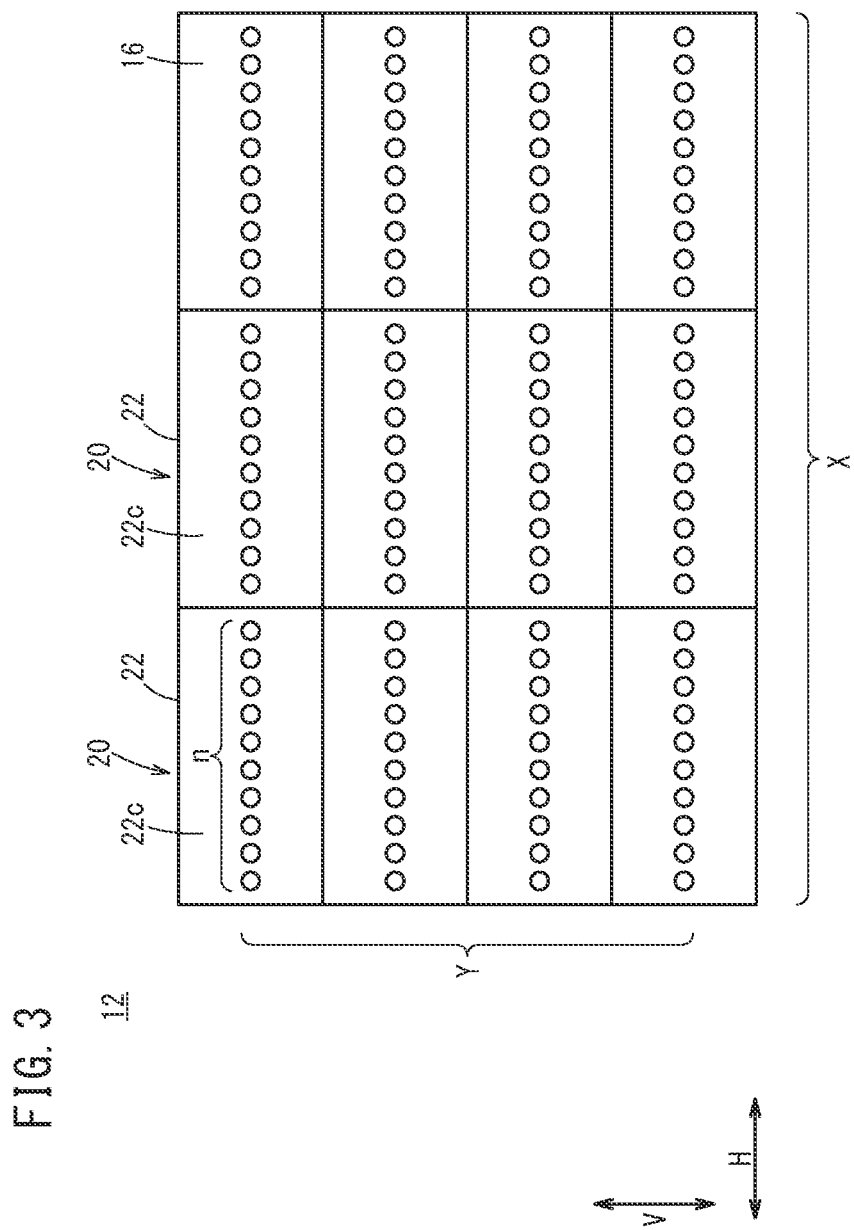

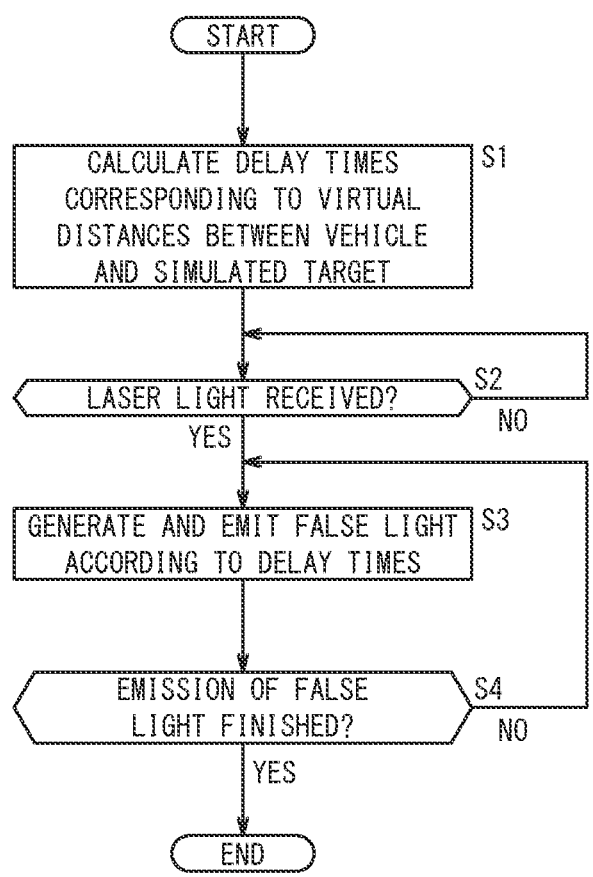

SIMULATOR DEVICE

TECHNICAL FIELD

The present invention relates to a simulator device for use with a LiDAR that illuminates a plurality of scanning positions with laser light, the simulator device generating false light corresponding to the laser light and emitting the false light to the LiDAR.

BACKGROUND ART

Japanese Laid-Open Utility Model Publication No. 02-014082 discloses a testing device for a distance measuring device that uses laser light. This testing device simulates a real testing environment. Specifically, the testing device collects the laser light emitted from a light emission lens of the distance measuring device, guides it in the device through optical fibers having lengths corresponding to desired delay times, and then returns the laser light to the distance measuring device, to thereby make the distance measuring device detect the simulated target separated at a given distance.

SUMMARY OF INVENTION

Recent onboard scanning LiDAR systems (hereinafter referred to as LiDAR) scan the external environment with laser light. If a testing device configured as disclosed in Japanese Laid-Open Utility Model Publication No. 02-014082 is used to test such a LiDAR by simulation, it will require optical transmission paths (optical fibers or the like) corresponding to the individual scanning positions of the LiDAR. LiDAR scans two thousand or more scanning positions. Providing the testing device with two thousand or more light transmission paths will complicate the configuration of the testing device and increase manufacturing and maintenance costs of the testing device.

The present invention has been devised taking such a problem into consideration and an object of the present invention is to provide a simulator device capable of realizing a simpler configuration and reduced costs.

An aspect of the present invention is directed to a simulator device for use with a LiDAR that illuminates a plurality of scanning positions with laser light, the simulator device generating false light corresponding to the laser light and emitting the false light to the LiDAR.

The simulator device includes:
condenser units configured to collect the laser light emitted to the plurality of scanning positions; and
a simulator configured to generate, in correspondence with the laser light collected by the condenser units, the false light simulating scattered light produced in a given position, and to emit the false light to the LiDAR through the condenser units.

The present invention enables the simulator device to be configured simpler and realizes cost reduction.

BRIEF DESCRIPTION OF DRAWINGS

FIG. 3 is a schematic diagram illustrating a light input/output unit viewed from the LiDAR side;
and
FIG. 4 is a flowchart illustrating a process performed by a simulator.

DESCRIPTION OF EMBODIMENTS

Figure 1:
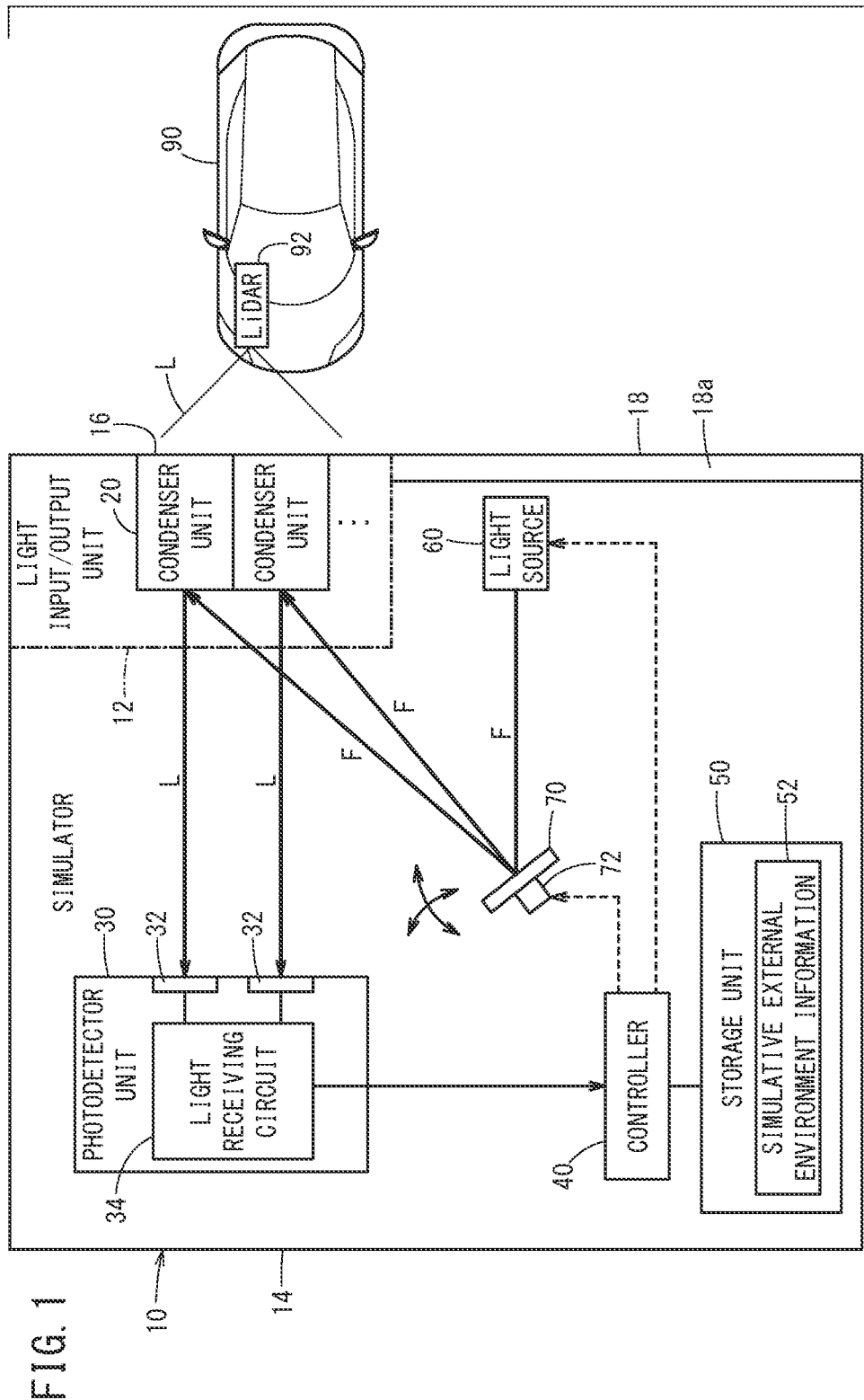
FIG. 1 is a device configuration diagram of a simulator device according to an embodiment.

The simulator device according to the present invention will be described in detail in connection with preferred embodiments while referring to the accompanying drawings.

1. Configuration of Simulator Device 10

A configuration of the simulator device 10 according to an embodiment will be described referring to FIG. 1. The simulator device 10 is used to test the performance of a scanning LiDAR 92, for example. The description below assumes that the simulator device 10 is used to test the LiDAR 92 mounted on a vehicle 90, but it can be used to test LiDAR 92 mounted in any devices other than the vehicle 90. The simulator device 10 includes a light input/output unit 12, a simulator 14, a light transmitting surface 16, and a light absorbing surface 18. The light transmitting surface 16 and the light absorbing surface 18 are positioned on the light input/output unit 12 side facing toward the LiDAR 92, and are arranged so that the scanning range of laser light L from the LiDAR 92 fits therein. A light absorbing material 18a is provided on the light absorbing surface 18.

Figure 2:
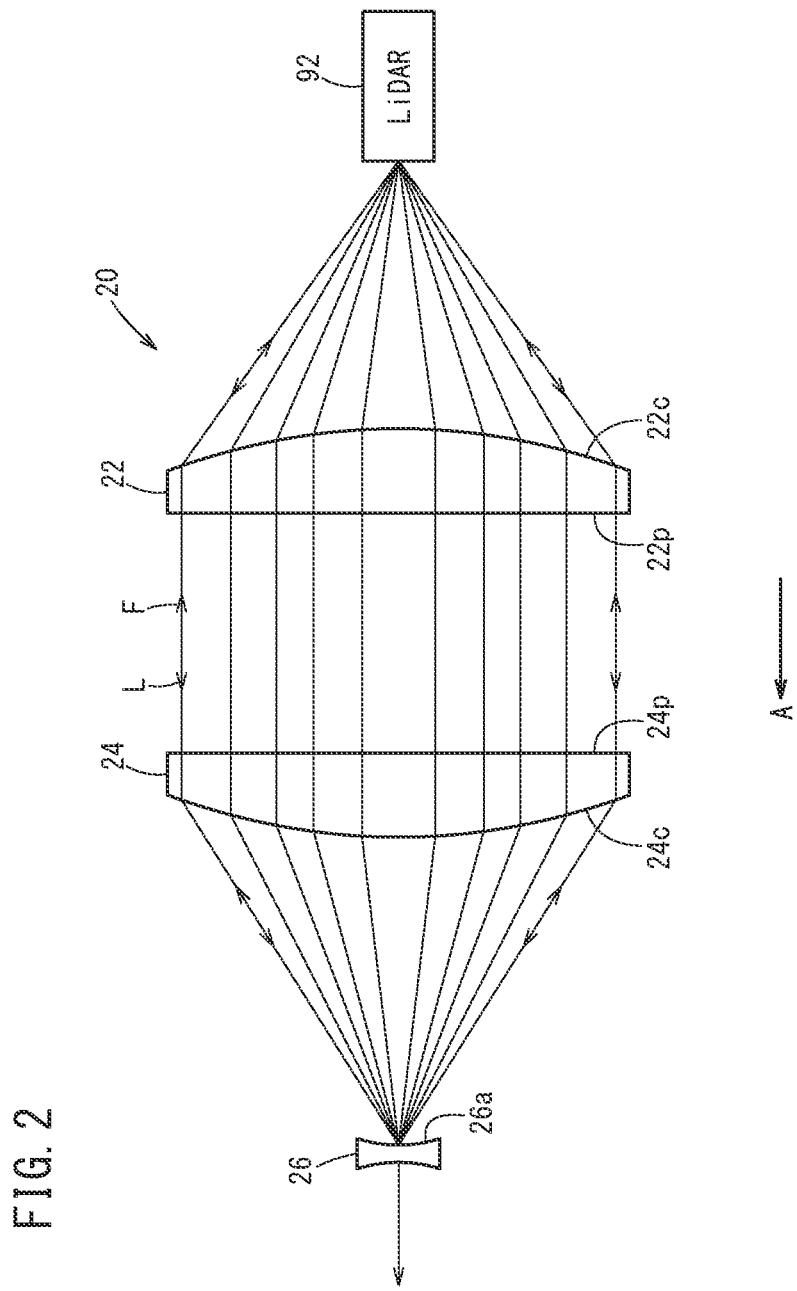
FIG. 2 is a configuration diagram of a condenser unit.

The light input/output unit 12 includes a plurality of condenser units 20. As shown in FIG. 2, each condenser unit 20 includes a first plano-convex lens 22, a second plano-convex lens 24, and a biconcave lens 26. The first plano-convex lens 22, the second plano-convex lens 24, and the biconcave lens 26 are arranged in this order along the direction from the LiDAR 92 (light transmitting surface 16) toward the simulator 14 (the direction A in FIG. 2) in such a manner that the center axes thereof are aligned on the same straight line. The first plano-convex lens 22 is arranged so that a convex surface 22c thereof faces the LiDAR 92 and a planar surface 22p thereof face to the second plano-convex lens 24. The second plano-convex lens 24 is arranged so that a planar surface 24p thereof faces the first plano-convex lens 22 and a convex surface 24c thereof faces the biconcave lens 26. The biconcave lens 26 is arranged so that one concave surface 26a thereof faces the second plano-convex lens 24. The convex surface 22c of the first plano-convex lens 22 and the convex surface 24c of the second plano-convex lens 24 are curved so as to collect the laser light L emitted from the LiDAR 92 onto the biconcave lens 26 and to collect false light F coming from the biconcave lens 26 onto the LiDAR 92. A biconvex lens may be provided in place of the first plano-convex lens 22 and the second plano-convex lens 24.

As shown in FIG. 3, the condenser units 20 are arranged along the light transmitting surface 16, with the convex surfaces 22c of the first plano-convex lenses 22 facing the LiDAR 92. Each condenser unit 20 includes a given number (n) of scanning positions arranged along a horizontal direction H. The arrangement and number of the condenser units 20 are determined according to the shape of the simulated target to be detected by the LiDAR 92. FIG. 3 shows an example configuration of the light input/output unit 12 in which X condenser units 20 are arranged along the horizontal direction H and Y condenser units 20 are arranged along a vertical direction V.

As shown in FIG. 1, the simulator 14 includes a photodetector unit 30, a controller 40, a storage unit 50, a light source 60, and a reflecting mirror 70. The photodetector unit 30 includes light receiving elements 32 receiving the laser light L emitted from the condenser units 20 and a light receiving circuit 34 to which the light receiving elements 32 are connected. The light receiving elements 32 are provided respectively corresponding to the condenser units 20. The controller 40 is formed of a processor such as a CPU etc., and executes a program stored in the storage unit 50 to control operations of the light source 60 and a mirror drive unit 72. The storage unit 50 is formed of a ROM, RAM, hard disk etc., and stores programs used by the controller 40 and various numerical values and simulative external environment information 52 used during the execution of the programs. The simulative external environment information 52 is information representing virtual distances dv from the LiDAR 92 to individual parts of a simulated target, for example. The simulative external environment information 52 may include information on a plurality of simulated targets. The light source 60 is a laser device, LED, or the like for generating pulsed false light F that simulates scattered light of the laser light L, and operates in response to operation signals output from the controller 40. The reflecting mirror 70 is an optical member that reflects the false light F generated by the light source 60 onto the biconcave lenses 26 of the condenser units 20. The reflecting mirror 70 is supported by the mirror drive unit 72. The mirror drive unit 72 includes an electric motor, a driving mechanism, and a motor drive circuit that are not shown. In response to operation signals output from the controller 40, the mirror drive unit 72 rotates the reflecting mirror 70 around a rotational axis that is perpendicular to a horizontal plane and a rotational axis that is perpendicular to a vertical plane.

2. Operations of Simulator Device 10

Operations of the simulator device 10 will be described referring to FIG. 4. The controller 40 of the simulator 14 starts operating when an instruction signal to start testing is input from an external instructing device (not shown). The external instructing device can be an input device through which an operator inputs various instructions and information, for example, or can be a main controller that collectively manages tests of other external environment sensors (cameras, radars, etc.) of the vehicle 90 as well as the testing of the LiDAR 92. The instruction signals may include information for selecting one of a plurality of simulated targets stored as the simulative external environment information 52. It is then possible to make the LiDAR 92 detect a simulated target in a different position for each testing.

First, the operator places the simulator device 10 in a given position. As the simulator device 10 is placed in the given position, the instructing device (not shown) outputs an instruction signal to start testing, and the operations described below are started.

In step S1, the controller 40 reproduces a simulated target in response to instructions from the instructing device and calculates delay times td corresponding to virtual distances dv between the vehicle 90 and the simulated target. The controller 40 calculates the delay time td, i.e., the time from reception of the laser light L at the light receiving element 32 to emission of the false light F from the condenser unit 20, based on the information on the simulated target being reproduced. The controller 40 calculates the delay time td individually for each of the light transmission paths passing through different condenser units 20. The delay times td are calculated according to the equation below. In the equation below, dr is the real distance from the LiDAR 92 to the simulator device 10 and c is the speed of light.

$$td = 2 \times \{(dv/c) - (dr/c)\}$$

In step S2, the controller 40 determines whether the light receiving element 32 corresponding to the first scanning position has received the laser light L. The LiDAR 92 scans all scanning positions with the laser light L. In each condenser unit 20, the laser light L illuminating a plurality of scanning positions is collected to the position of the biconcave lens 26 through the first plano-convex lens 22 and the second plano-convex lens 24. The collected laser light L enters the light receiving element 32 corresponding to the condenser unit 20. When the laser light L enters the light receiving element 32, an electric signal is generated in the light receiving circuit 34. The controller 40 receives the electric signal generated in the light receiving circuit 34 to detect that the light receiving element 32 has received the laser light L. When any of the light receiving elements 32 has received the laser light L (step S2: YES), the process moves to step S3. If no light receiving element 32 has received the laser light L (step S2: NO), then the determination of step S2 is made continuously.

In step S3, the controller 40 generates the false light F in accordance with the delay times td calculated in step S1. The controller 40 controls the operation of the light source 60 and the operation of the mirror drive unit 72 (the attitude of the reflecting mirror 70) so that, after the delay time td has passed after the light receiving element 32 received the laser light L, the false light F enters the condenser unit 20 corresponding to the light receiving element 32. The light source 60 emits pulsed false light F. The mirror drive unit 72 directs the reflecting mirror 70 to the condenser unit 20 specified by the controller 40. Then, the false light F emitted from the light source 60 is reflected at the reflecting mirror 70 and enters the condenser unit 20. The false light F is diverged in the horizontal direction H at the biconcave lens 26. The diverged false light F is collected to the position of the LiDAR 92 through the second plano-convex lens 24 and the first plano-convex lens 22. In this way, each condenser unit 20 collectively emits, to the LiDAR 92, the false light F corresponding to the laser light L scattered at a plurality of scanning positions.

In step S4, the controller 40 determines whether the illumination of the LiDAR 92 with the false light F has finished. If the illumination with the false light F has finished (step S4: YES), the series of processing, that is, the process for one scan with the laser light L, is ended. If the illumination with the false light F has not finished yet (step S4: NO), the operation of step S3 is continued.

3. Modification

In the embodiment above, the simulator 14 is configured to emit the false light F to all condenser units 20. Alternatively, the simulator 14 can be configured to generate false light F corresponding to the shape of the simulated target and to emit the false light F to the corresponding condenser units 20. In this case, the simulator 14 artificially generates scattered light that is scattered at a simulative position of the simulated target and emits the scattered light. The false light F is emitted only to some condenser units 20 accordingly.

Further, although each condenser unit 20 in the embodiment above includes the first plano-convex lens 22, the second plano-convex lens 24, and the biconcave lens 26, the condenser unit 20 may include curved mirrors in place of the lenses.

The embodiment above has described an example in which the simulator device 10 is used to test the LiDAR 92. However, the simulator device 10 can be used to develop the LiDAR 92.

4. Technical Idea Obtained from Embodiments

The technical idea that can be grasped from the embodiments and modifications will be recited below.

An aspect of the present invention provides a simulator device 10 for use with a LiDAR 92 that illuminates a plurality of scanning positions with laser light L, the simulator device 10 generating false light F corresponding to the laser light L and emitting the false light F to the LiDAR 92. The simulator device 10 includes:

condenser units 20 configured to collect the laser light L emitted to the plurality of scanning positions; and a simulator 14 configured to generate, in correspondence with the laser light L collected by the condenser units 20, the false light F simulating scattered light L produced in a given position, and to emit the false light F to the LiDAR 92 through the condenser units 20.

According to the configuration above, the laser light L illuminating a plurality of scanning positions is collected through the condenser units 20 and the false light F corresponding to the collected laser light L is emitted to the LiDAR 92 through the condenser units 20. This eliminates the need to provide light transmission paths for individual scanning positions. It is thus possible to simplify the configuration of the simulator device 10 and enable cost reduction.

The simulator device 10 of the invention may further include optical members (biconcave lenses 26) configured to diverge the false light F, and the simulator 14 may emit the diverged false light F to the LiDAR 92 through the condenser units 20.

With this configuration, the condenser units 20 can be used both for input and output of light by emitting the false light F, after being diverged, to the LiDAR 92 through the condenser units 20. It is thus possible to further simplify the configuration of the simulator device 10 and enable further cost reduction.

The simulator device 10 of the invention may further include a light absorbing material 18a configured to absorb the laser light L at scanning positions where the laser light L is not scattered.

With the configuration above, the light absorbing material 18a absorbs the laser light L that illuminates scanning positions other than the condenser units 20, and therefore scattered light is not generated. This enables the simulation to be conducted highly accurately.

The simulator device according to the present invention is not limited to the embodiments described above but can adopt various configurations without departing from the essence and gist of the invention.

What is claim is:

1. A simulator device for use with a LiDAR that illuminates a plurality of scanning positions with laser light, the simulator device generating false light corresponding to the laser light and emitting the false light to the LiDAR, the simulator device comprising:

condenser units configured to collect the laser light emitted to the plurality of scanning positions; and a simulator configured to generate, in correspondence with the laser light collected by the condenser units, the false light simulating scattered light produced in a given position, and to emit the false light to the LiDAR through the condenser units, wherein the simulator includes one light source that generates the false light, one reflecting mirror that reflects the false light generated by the light source onto the condenser units, a mirror drive unit that rotates the reflecting mirror, and a controller that controls an operation of the light source and an operation of the mirror drive unit so that the false light enters the condenser units.

2. The simulator device according to claim 1, further comprising optical members configured to diverge the false light, wherein the simulator emits the diverged false light to the LiDAR through the condenser units.

3. The simulator device according to claim 1, further comprising a light absorbing material configured to absorb the laser light at scanning positions where the laser light is not scattered.

* * * * *